(12) United States Patent
Seo et al.

(10) Patent No.: US 9,537,634 B2
(45) Date of Patent: Jan. 3, 2017

(54) METHOD AND APPARATUS FOR RECEIVING CONTROL INFORMATION THROUGH EPDCCH IN WIRELESS COMMUNICATION SYSTEM

(71) Applicant: LG Electronics Inc., Seoul (KR)

(72) Inventors: Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 14/405,887

(22) PCT Filed: Jun. 7, 2013

(86) PCT No.: PCT/KR2013/005024
§ 371 (c)(1),
(2) Date: Dec. 5, 2014

(87) PCT Pub. No.: WO2013/183956
PCT Pub. Date: Dec. 12, 2013

(65) Prior Publication Data
US 2015/0146639 A1    May 28, 2015

Related U.S. Application Data

(60) Provisional application No. 61/657,022, filed on Jun. 7, 2012.

(51) Int. Cl.
*H04W 4/00* (2009.01)
*H04L 5/00* (2006.01)

(52) U.S. Cl.
CPC ........... *H04L 5/0053* (2013.01); *H04L 5/0094* (2013.01)

(58) Field of Classification Search
None
See application file for complete search history.

(56) References Cited

U.S. PATENT DOCUMENTS

2009/0168922 A1   7/2009  Malladi et al.
2009/0201869 A1*  8/2009  Xu ..................... H04L 1/1671
                                          370/329

(Continued)

FOREIGN PATENT DOCUMENTS

WO    2011/122852 A2    10/2011

OTHER PUBLICATIONS

U.S. Appl. No. 61/644,972; Lee et al.*

(Continued)

*Primary Examiner* — Kwang B Yao
*Assistant Examiner* — Juvena Loo
(74) *Attorney, Agent, or Firm* — Dentons US LLP

(57) ABSTRACT

One embodiment of the present invention relates to a method for a terminal receiving control information through an enhanced physical downlink control channel (EPDCCH) in a wireless communication system, comprising the steps of: indexing resource elements (RE), which are included in a physical resource block (PRB) set of a received subframe, in units of enhanced resource element groups (EREG); indexing the EREGs that are indexed in units of enhanced control channel elements (ECCE); and determining EPDCCH candidates which comprise a terminal-specific search space on the basis of the ECCEs which are indexed, and then blind decoding same, wherein the terminal determines whether a predetermined resource unit for a common search space and the terminal-specific search space overlap.

9 Claims, 12 Drawing Sheets

(56) References Cited

U.S. PATENT DOCUMENTS

| | | | |
|---|---|---|---|
| 2011/0243090 A1 | 10/2011 | Grovlen et al. | |
| 2012/0063413 A1 | 3/2012 | Kroener et al. | |
| 2012/0106494 A1* | 5/2012 | Moulsley | H04L 5/0091 370/329 |
| 2013/0064216 A1* | 3/2013 | Gao | H04L 5/0016 370/330 |
| 2013/0194931 A1* | 8/2013 | Lee | H04L 5/0053 370/241 |
| 2013/0250874 A1* | 9/2013 | Luo | H04W 72/04 370/329 |
| 2013/0301562 A1* | 11/2013 | Liao | H04W 72/042 370/329 |

OTHER PUBLICATIONS

U.S. Appl. No. 61/615,803; Luo.*
ZTE, "PDCCH Blind decoding and search space on SCC", R1-104552, 3GPP TSG-RAN WG1 #62, Madrid, Spain, Aug. 23-27, 2010, 2 pages.

* cited by examiner

FIG. 6
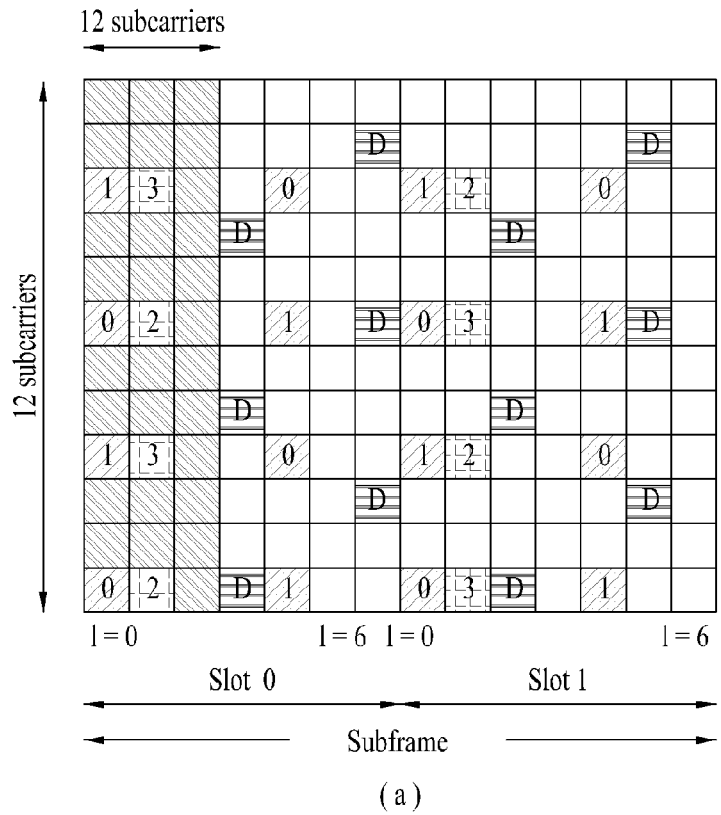
(a)
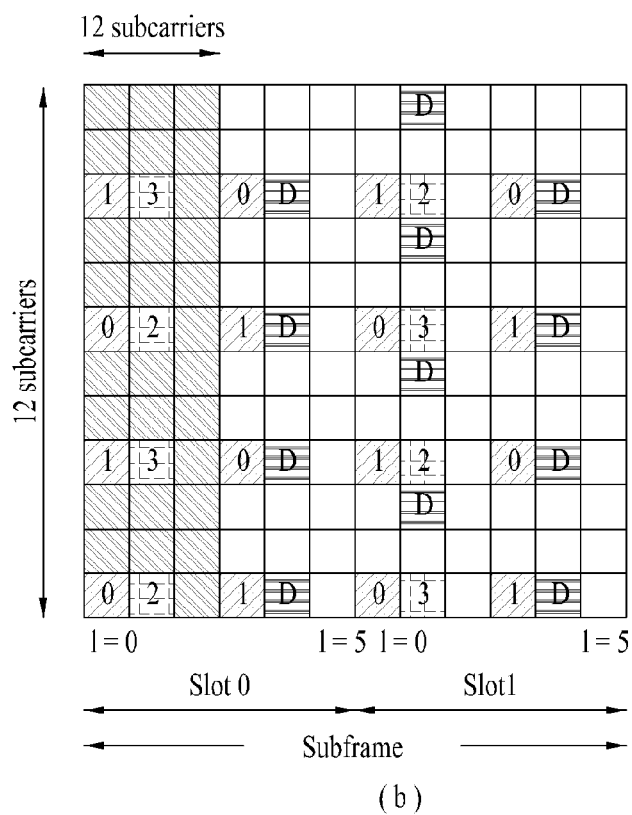
(b)

MeNB : macro eNodeB
PeNB : pico eNodeB
FeNB : femto eNodeB

MUE : macro UE
PUE : pico UE
FUE : femto eNodeB

FIG. 8
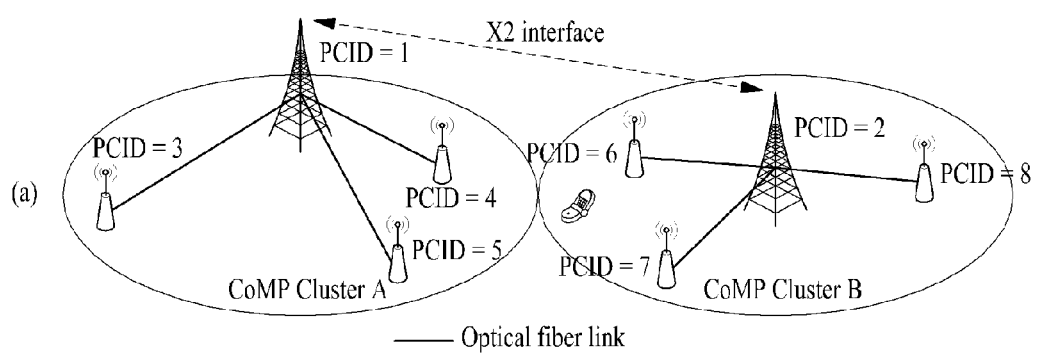
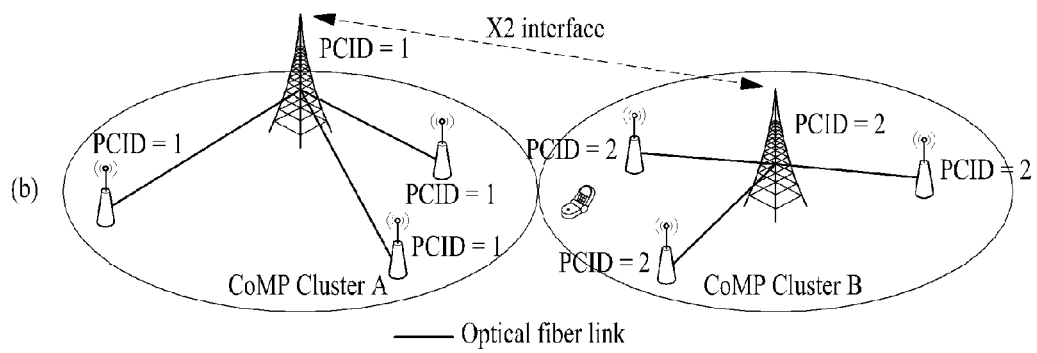

METHOD AND APPARATUS FOR RECEIVING CONTROL INFORMATION THROUGH EPDCCH IN WIRELESS COMMUNICATION SYSTEM

DESCRIPTION

This Application is a 35 U.S.C. §371 National Stage entry of International Application No. PCT/KR2013/005024, filed Jun. 7, 2013, which claims benefit of Provisional Application No. 61/657,022 filed Jun. 7, 2012, both of which are incorporated by reference in their entirety herein.

TECHNICAL FIELD

The present invention relates to a wireless communication system, and more particularly, to a method and apparatus for receiving control information on an Enhanced Physical Downlink Control Channel (EPDCCH).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi-Carrier Frequency Division Multiple Access (MC-FDMA) system, etc.

DISCLOSURE

Technical Problem

An object of the present invention is to provide a method for receiving control information by a User Equipment (UE), when a common search space is defined in an Enhanced Physical Downlink Control Channel (EPDCCH), particularly when a UE-specific search space and a common search space are overlapped.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving control information on an Enhanced Physical Downlink Control Channel (EPDCCH) by a User Equipment (UE) in a wireless communication system includes indexing Resource Elements (REs) included in a Physical Resource Block (PRB) set of a received subframe in units of an Enhanced Resource Element Group (EREG), indexing the indexed EREGs in units of an Enhanced Control Channel Element (ECCE), and determining EPDCCH candidates forming a UE-specific search space based on the indexed ECCEs and performing blind decoding on the determined EPDCCH candidates. The UE determines whether a specific resource unit of a common search space overlaps with the UE-specific search space.

In another aspect of the present invention, a UE for receiving control information on an EPDCCH in a wireless communication system includes a reception module, and a processor. The processor is configured to index REs included in a PRB set of a received subframe in units of an EREG, to index the indexed EREGs in units of an ECCE, determine EPDCCH candidates forming a UE-specific search space based on the indexed ECCEs, and to perform blind decoding on the determined EPDCCH candidates. The processor determines whether a specific resource unit of a common search space overlaps with the UE-specific search space.

The above aspects of the present invention may include the followings.

If the specific resource unit for the common search space overlaps with the UE-specific search space, the UE may exclude the specific resource unit from the EREG indexing or the ECCE indexing.

If the specific resource unit for the common search space overlaps with the UE-specific search space, the UE may skip an EPDCCH candidate including the specific resource unit during the blind decoding.

If the specific resource unit for the common search space overlaps with the UE-specific search space, the UE may determine an EPDCCH candidate using a resource apart from the specific resource unit by an offset.

The resource apart from the specific resource unit by the offset may not be included either the common search space or the UE-specific search space.

A scheduling request may be transmitted in a resource configured for transmission of an ACKnowledgement/Negative ACKnowledgement (ACK/NACK) related to the specific resource unit.

The specific resource unit may be one of an EREG and an ECCE.

The specific resource unit may be indicated by higher-layer signaling.

The PRB set may be one of a distributed EPDCCH PRB set and a localized EPDCCH PRB set.

The common search space may be located in the PRB set of the subframe.

The ECCE may include four EREGs.

A Physical Uplink Control Channel (PUCCH) for transmission of an ACK related to the common search space and the UE-specific search space may be configured for each of the common search space and the UE-specific search space.

Advantageous Effects

According to the present invention, even though a common search space is defined in an Enhanced Physical Downlink Control Channel (EPDCCH) and a User Equipment (UE)-specific search space is overlapped with at least a part of the common search space, a UE can receive control information successfully.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 6 a and b illustrate Reference Signals (RSs);

FIGS. 8 a and b illustrate exemplary Coordinated Multi-Point (CoMP) clusters;

BEST MODE FOR CARRYING OUT THE INVENTION

Figure 1:
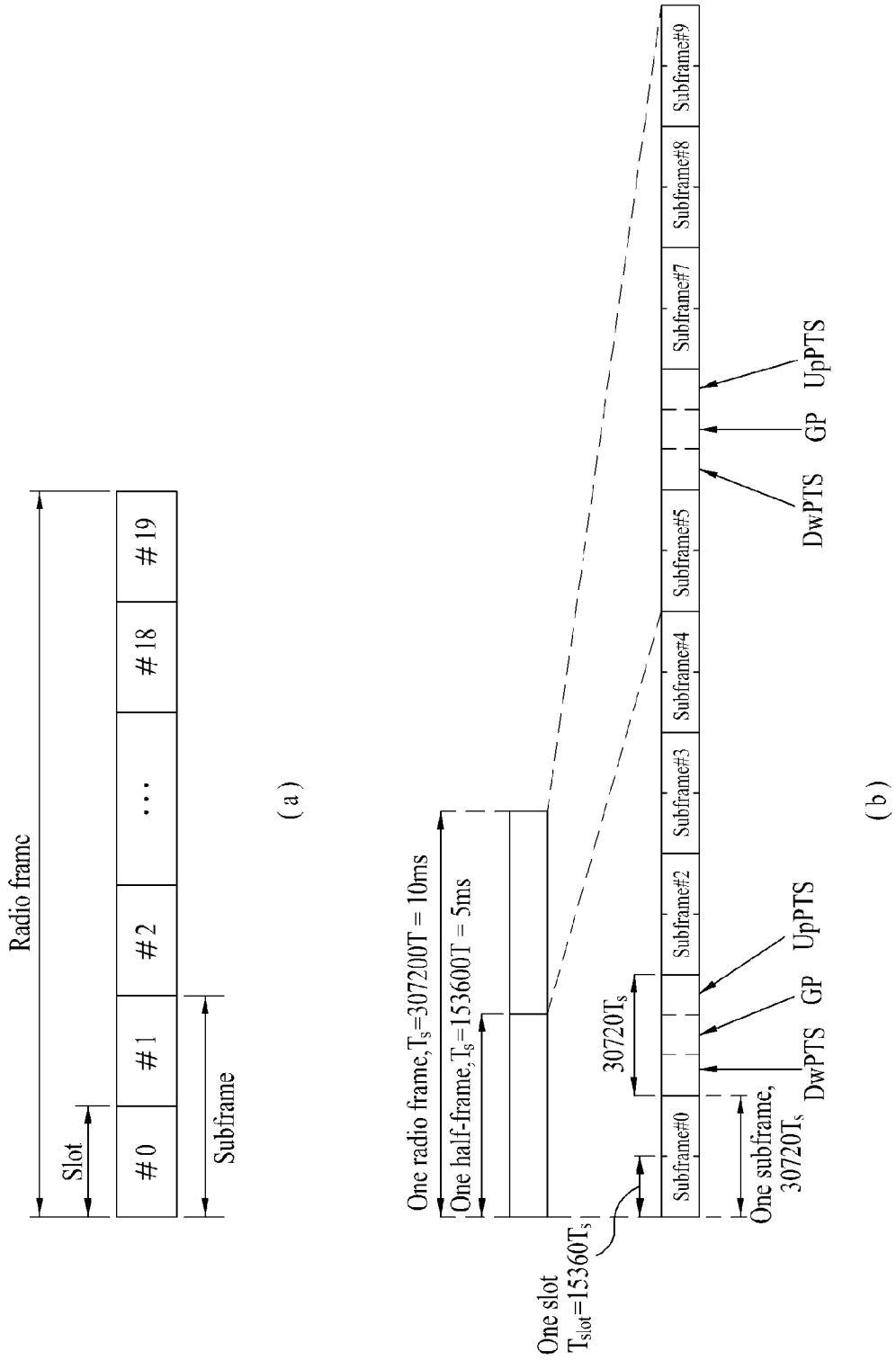
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for Downlink (DL) and SC-FDMA for Uplink (UL). LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, the present disclosure focuses on the 3GPP LTE and LTE-A systems. However, the technical features of the present invention are not limited thereto.

With reference to FIG. 1, a radio frame structure will be described below.

In a cellular Orthogonal Frequency Division Multiplexing (OFDM) wireless packet communication system, UL/DL data packets are transmitted in subframes. One subframe is defined as a predetermined time interval including a plurality of OFDM symbols. The 3GPP LTE standards support a type 1 radio frame structure applicable to Frequency Division Duplex (FDD) and a type 2 radio frame structure applicable to Time Division Duplex (TDD).

FIG. 1(a) is a diagram illustrating the structure of the type 1 radio frame. A DL radio frame includes 10 subframes, each subframe including two slots in the time domain. A time required for transmitting one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since the 3GPP LTE system uses OFDMA on DL, an OFDM symbol represents one symbol period. An OFDM symbol may be called an SC-FDMA symbol or symbol period. An RB is a resource allocation unit and may include a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of normal CP. In the case of extended CP, for example, one slot may include 6 OFDM symbols. If a channel state is instable as is the case with a fast UE, the extended CP may be used in order to further reduce inter-symbol interference.

In the case of normal CP, since one slot includes 7 OFDM symbols, one subframe includes 14 OFDM symbols. The first two or three OFDM symbols of each subframe may be allocated to a Physical Downlink Control Channel (PDCCH) and the remaining OFDM symbols may be allocated to a Physical Downlink Shared Channel (PDSCH).

FIG. 1(b) illustrates the structure of the type 2 radio frame. The type 2 radio frame includes two half frames, each half frame including 5 subframes, a Downlink Pilot Time Slot (DwPTS), a Guard Period (GP), and an Uplink Pilot Time Slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal. Irrespective of the type of a radio frame, one subframe includes two slots.

The structures of radio frames are only exemplary. Accordingly, the number of subframes in a radio frame, the number of slots in a subframe, and the number of symbols in a slot may vary.

Figure 2:
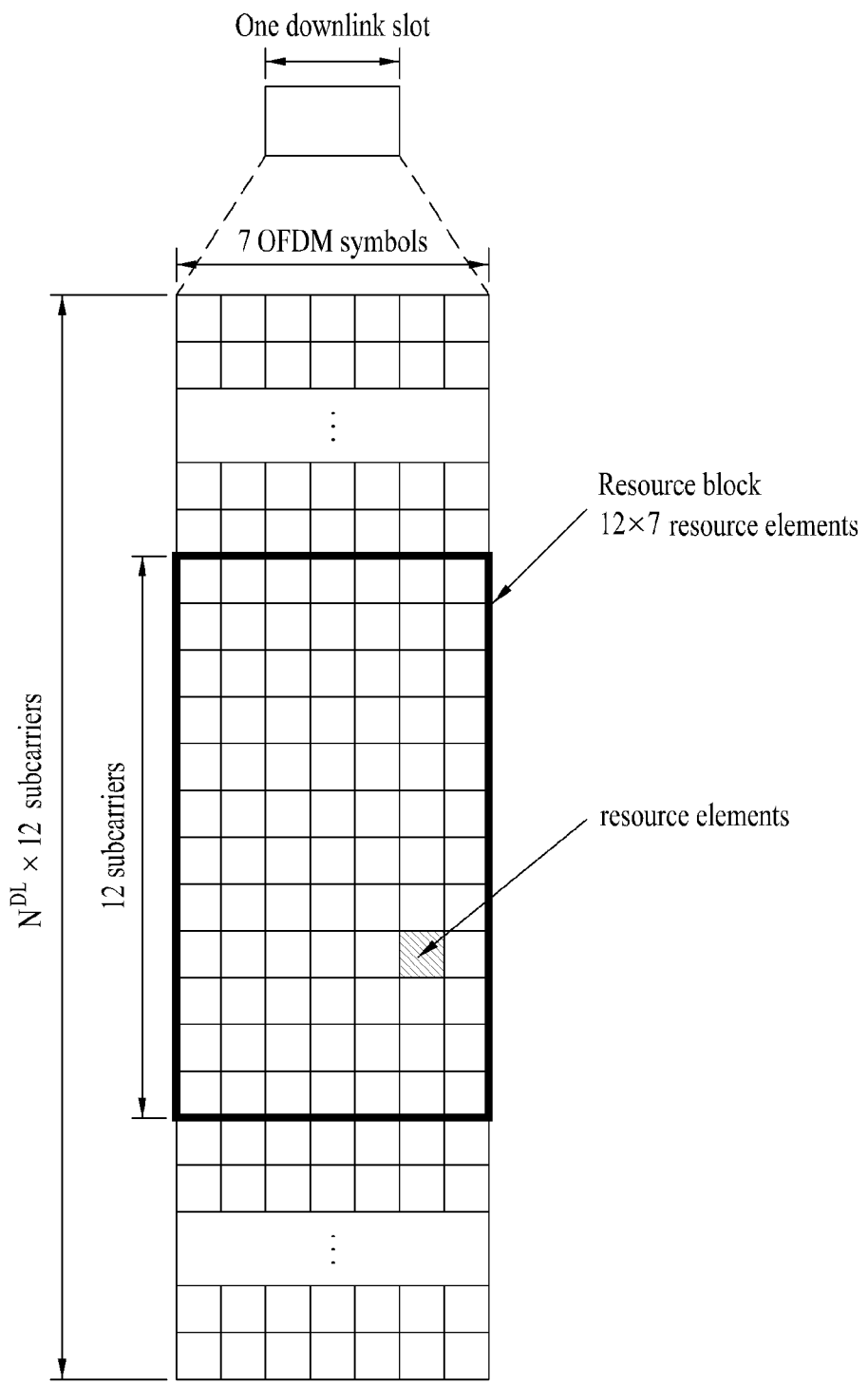
FIGS. 2 a and b illustrate structures of a downlink resource grid for the duration of one downlink slot.

FIG. 2 illustrates the structure of a DL resource grid for the duration of one DL slot. One DL slot includes 7 OFDM symbols in the time domain and one RB includes 12 subcarriers in the frequency domain, which does not limit the present invention. For example, a DL slot may include 7 OFDM symbols in the case of the normal CP, whereas a DL slot may include 6 OFDM symbols in the case of the extended CP. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 3:
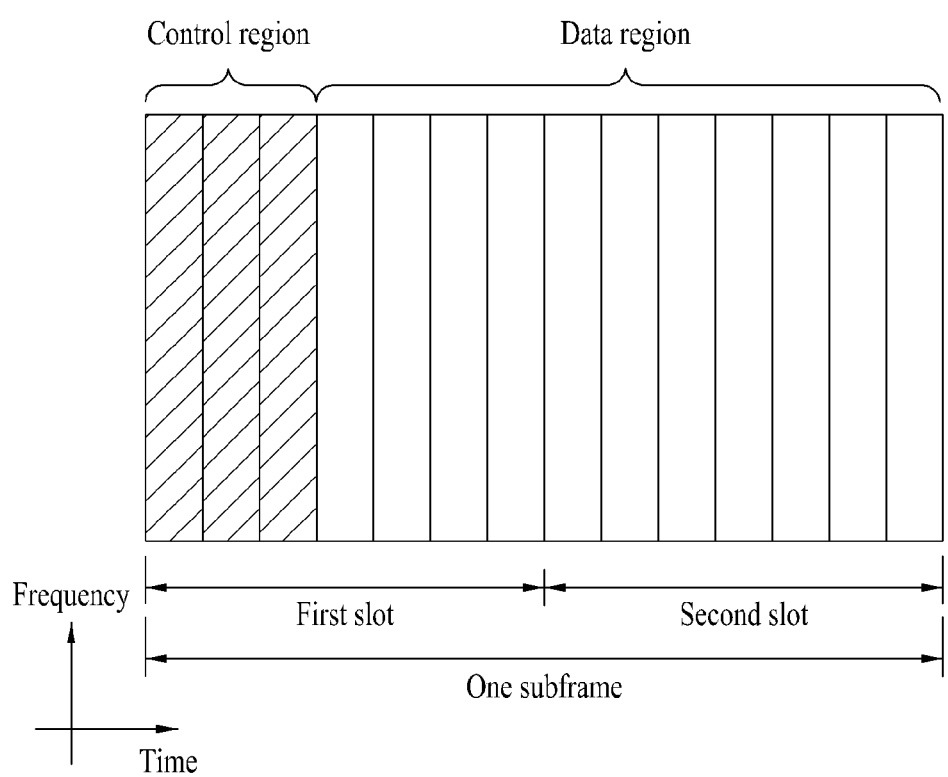
FIG. 3 illustrates a structure of a downlink subframe.

FIG. 3 illustrates the structure of a DL subframe. Up to three OFDM symbols at the start of the first slot in a DL subframe are used for a control region to which control channels are allocated and the other OFDM symbols of the DL subframe are used for a data region to which a PDSCH is allocated. DL control channels used in the 3GPP LTE system include a Physical Control Format Indicator Channel (PCFICH), a Physical Downlink Control Channel (PDCCH), and a Physical Hybrid automatic repeat request (HARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to a UL transmission. Control information carried on the PDCCH is called Downlink Control Information (DCI). The DCI transports UL or DL scheduling information, or UL transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the correlation between the number of CCEs and a coding rate provided by the CCEs. An eNB determines a PDCCH format according to DCI transmitted to a UE and adds a Cyclic Redundancy Check (CRC) to the control information. The CRC is masked by an Identifier (ID) known as a Radio Network Temporary Identifier (RNTI) according to the owner or usage of the PDCCH. If the PDCCH is directed to a specific UE, its CRC may be masked by a Cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
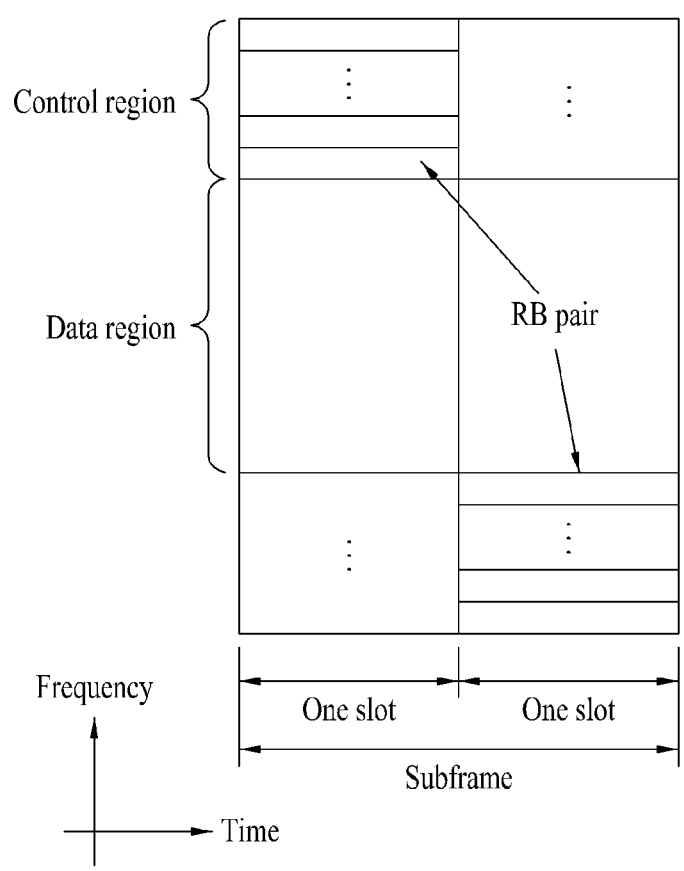
FIG. 4 illustrates a structure of an uplink subframe.

FIG. 4 illustrates the structure of a UL subframe. A UL subframe may be divided into a control region and a data region in the frequency domain. A Physical Uplink Control Channel (PUCCH) carrying Uplink Control Information (UCI) is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

DCI Format

The current LTE-A standard (conforming to release 10) defines DCI formats 0, 1, 1A, 1B, 1C, 1D, 2, 2A, 2B, 2C, 3, 3A, and 4. It is regulated that DCI formats 0, 1A, 3, and 3A have the same message size to reduce the number of blind decodings, which will be described later. Depending on the usages of control information carried in DCI formats, the DCI formats may be classified into i) DCI formats 0 and 4 used for carrying a UL ACK, ii) DCI formats 1, 1A, 1B, 1C, 1D, 2, 2A, 2B, and 2C used for carrying a DL scheduling assignment, and iii) DCI formats 3 and 3A used for carrying a power control command.

DCI format 0 used for carrying a UL ACK may include a carrier indicator needed for later-described carrier aggregation, a flag for DCI format 0/1A differentiation, a frequency hopping flag indicating whether frequency hopping is used for a UL PUSCH transmission, information about a resource block assignment that a UE will use for a PUSCH transmission, a modulation and coding scheme, a new data indicator used to empty a buffer for an initial transmission in relation to an HARQ process, a Transmission Power Control (TPC) command for a PUSCH, a cyclic shift and Orthogonal Cover Code (OCC) index for Demodulation Reference Signal (DMRS), a UL index needed for a Time Division Duplexing (TDD) operation, a Channel State Information (CSI) request, etc. Since DCI format 0 adopts synchronous HARQ, it does not include a redundancy version, unlike DCI formats related to a DL scheduling assignment. If cross carrier scheduling is not used, a carrier indicator is not included in a DCI format.

DCI format 4 is added in LTE-A release 10 to support spatial multiplexing for UL transmission in the LTE-A system. Compared to DCI format 0, DCI format 4 further includes information needed for spatial multiplexing. Thus, DCI format 4 has a larger message size and includes further control information in addition to control information included in DCI format 0. That is, DCI format 4 further includes information about a modulation and coding scheme of a second transport block, precoding information for multi-antenna transmission, and Sounding Reference Signal (SRS) request information. Because DCI format 4 is larger than DCI format 0 in size, DCI format 4 does not include a flag for DCI format 0/1A differentiation.

DCI formats 1, 1A, 1B, 1C, 1D, 2, 2A, 2B, and 2C related to a DL scheduling assignment may be classified largely into DCI formats 1, 1A, 1B, 1C, and 1D that do not support spatial multiplexing and DCI formats 2, 2A, 2B, and 2C that support spatial multiplexing.

DCI format 1C, also known as a compact DL assignment, supports only frequency-continuous allocation. Compared to other formats, DCI format 1C does not include a carrier indicator and a redundancy version.

DCI format 1A is used for DL scheduling and a random access procedure. DCI format 1A may include a carrier indicator, an indicator indicating whether DL distributed transmission is used, resource allocation information for a PDSCH, a modulation and coding scheme, a redundancy version, an HARQ process number indicating a processor used for soft combining, a new data indicator used to empty a buffer for an initial transmission in relation to an HARQ process, a TPC command for a PUCCH, a UL index needed for a TDD operation, etc.

Most of control information transmitted in DCI format 1 is similar to control information transmitted in DCI format 1A. Compared to DCI format 1A related to contiguous resource allocation, DCI format 1 supports non-contiguous resource allocation. Thus, DCI format 1 further includes a resource allocation header, thereby increasing control signaling overhead which is in a tradeoff relationship with respect to resource allocation flexibility.

DCI formats 1B and 1D are common in that they further include precoding information, compared to DCI format 1. DCI format 1B includes PMI confirmation and DCI format 1D includes DL power offset information. Most of the other control information included in DCI formats 1B and 1D is identical to control information included in DCI format 1A.

DCI formats 2, 2A, 2B, and 2C basically include most of control information included in DCI format 1A. Further, DCI formats 2, 2A, 2B, and 2C include information for spatial multiplexing. The information for spatial multiplexing specifies a modulation and coding scheme for a second transport block, a new data indicator, and a redundancy version.

DCI format 2 supports closed-loop spatial multiplexing and DCI format 2A supports open-loop spatial multiplexing. Both DCI formats 2 and 2A include precoding information. DCI format 2B supports dual-layer spatial multiplexing combined with beamforming and further includes a cyclic shift and OCC index for DMRS. DCI format 2C may be regarded as an extension of DCI format 2B and supports spatial multiplexing of up to eight layers.

DCI formats 3 and 3A may be used to supplement TPC information included in the afore-described DCI formats used for carrying a UL ACK and a DL scheduling assignment, that is, to support semi-persistent scheduling. A 1-bit command per UE and a 2-bit command per UE are used respectively in DCI formats 3 and 3A.

One of the foregoing DCI formats may be transmitted on one PDCCH and a plurality of PDCCHs may be transmitted in a control region. A UE may monitor a plurality of PDCCHs.

PDCCH Processing

Contiguous logical allocation units, CCEs are used to map a PDCCH to REs. One CCE includes a plurality of (e.g., 9) REGs, each REG having 4 contiguous REs except for an RE occupied by an RS.

The number of CCEs required for a specific PDCCH depends on the size of control information, that is, the size of DCI payload, a cell bandwidth, a channel coding rate, etc. Specifically, the number of CCEs for a specific PDCCH may be defined according to a PDCCH format, as illustrated in [Table 1] below.

TABLE 1

| PDCCH format | Number of CCEs | Number of REGs | Number of bits in PDCCH |
| --- | --- | --- | --- |
| 0 | 1 | 9 | 72 |
| 1 | 2 | 18 | 144 |
| 2 | 4 | 36 | 288 |
| 3 | 8 | 72 | 576 |

As described before, a PDCCH may be configured in one of the afore-described four formats. The format of the PDCCH is not known to a UE. Accordingly, the UE should decode the PDCCH without knowledge of the PDCCH format. This operation is called blind decoding. However, decoding of all possible DL CCEs for each PDCCH format imposes a great constraint on the UE. Therefore, a Search Space (SS) is defined in consideration of limitations of a scheduler and the number of decoding attempts.

That is, an SS is a set of candidate PDCCHs each including CCEs that the UE should attempt to decode based on an aggregation level. Aggregation levels and numbers of PDCCH candidates may be defined as illustrated in [Table 2].

TABLE 2

| Search space | | | |
| --- | --- | --- | --- |
| | Aggregation level | Size (in CCEs) | Number of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As noted from [Table 2], there are four aggregation levels and the UE has a plurality of SSs for each aggregation level. As illustrated in [Table 2], SSs are categorized into UE-specific SS (USS) and Common SS (CSS). A USS is for specific UEs. Each UE may check a masked RNTI and CRC of a PDCCH by monitoring the USS (by attempting to decode a set of PDCCH candidates according to possible DCI formats). If the RNTI and CRC are valid, the UE may acquire control information from the PDCCH.

A CSS is for the case where a plurality of UEs or all UEs need to receive a PDCCH, for example, information about dynamic scheduling of system information, a paging message, etc. However, the CSS may be used for a specific UE depending on resource management. In addition, the CSS may overlap with a USS.

The CSS may be determined specifically by the following equation.

$$L\{Y_k + m') \bmod \lfloor N_{CCE,k}/L \rfloor\} + i \qquad \text{[Equation 1]}$$

In [Equation 1], L represents an aggregation level, $Y_k$ is a variable determined by an RNTI and subframe number k, m' represents the number of PDCCH candidates, determined by $m'=m+M^{(L)} \cdot n_{CI}$ if carrier aggregation is used and otherwise, determined by $m'=m$ ($m=0, \ldots, M^{(L)})-1$ where $M^{(L)}$ is the number of PDCCHs), $N_{CCE,k}$ is the total number of CCEs in the control region of a $k^{th}$ subframe, and i is a factor indicating an individual CCE for each PDCCH candidate ($i=0, \ldots, L-1$). For a CSS, $Y_k$ is always 0.

Figure 5:
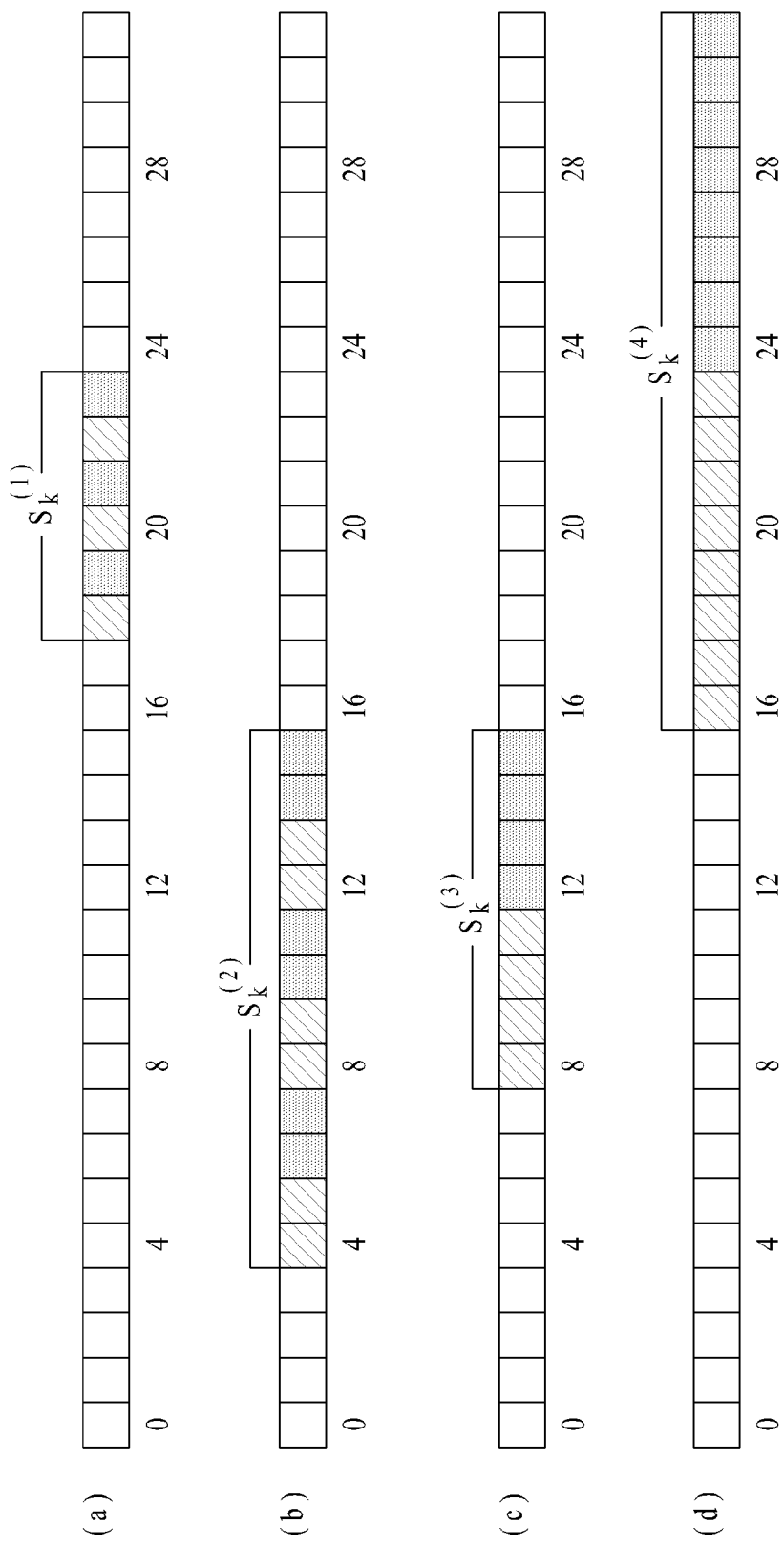
FIGS. 5 a, b, c and d illustrate search spaces.

FIG. 5 illustrates a USS (shaded parts) for each aggregation level, as defined by [Equation 1]. Herein, it is made clear that carrier aggregation is not used and $N_{CCE,k}$ is 32, for the convenience of description.

FIGS. 5(a), 5(b), 5(c), and 5(d) illustrate USSs for aggregation levels 1, 2, 4, and 8, respectively. In FIG. 5, numbers denote CCE numbers, and the starting CCE of an SS for each aggregation level is determined by an RNTI and subframe number k as described before. For a UE, different starting CCEs in the same subframe may be determined for different aggregation levels due to a modulo function and L. A stating CCE is always determined to be a multiple of an aggregation level due to L. Herein, $Y_k$ is assumed to be CCE number 18, by way of example. A UE attempts to sequentially decode in units of CCEs determined according to an aggregation level, starting from a starting CCE. For example, the UE attempts to decode two CCEs according to an aggregation level, starting from a stating CCE, CCE number 4 in FIG. 5(b).

As described above, a UE attempts to decode an SS. The number of decoding attempts is determined according to a DCI format and a transmission mode indicated by Radio Resource Control (RRC) signaling. If carrier aggregation is not used, the UE needs to attempt up to 12 decodings because it should consider two DCI sizes (DCI format 0/1A/3/3A and DCI format 1C) for each of six PDCCH candidates in a CSS. For a USS, the UE needs to attempt up to 32 decodings because it considers two DCI sizes for 16 PDCCHs (6+6+2+2+2=16). Accordingly, if carrier aggregation is not used, up to 44 decoding attempts are needed.

On the other hand, if carrier aggregation is used, as many decodings as the number of DL resources (DL component carriers) are added for a USS and DCI format 4. As a result, the maximum number of decodings is further increased.

Reference Signals (RSs)

In a wireless communication system, a packet is transmitted on a radio channel. In view of the nature of the radio channel, the packet may be distorted during transmission. To receive the signal successfully, a receiver should compensate for the distortion of the received signal using channel information. Generally, to enable the receiver to acquire the channel information, a transmitter transmits a signal known to both the transmitter and the receiver and the receiver acquires channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each antenna, particularly through each antenna port.

RSs may be divided into DL RSs and UL RSs. In the current LTE system, the UL RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of a UL channel in a different frequency.

The DL RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when DL DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires DL channel information, the former should be transmitted in a broad band and received even by a UE that does not receive DL data in a specific subframe. This RS is also used in a situation like handover. The latter is an RS that an eNB transmits along with DL data in specific resources. A UE can demodulate the data by measuring a channel using the RS. This RS should be transmitted in a data transmission area.

CRS serves two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna port 0 and antenna port 1 are transmitted. In the case of four Tx antennas, CRSs for antenna port 0 to antenna port 3 are transmitted respectively.

FIG. 6 illustrates patterns in which CRSs and DRSs are mapped to a DL RB pair, as defined in a legacy 3GPP LTE system (e.g. conforming to Release-8). An RS mapping unit, i.e. a DL RB pair may include one subframe in time by 12 subcarriers in frequency. That is, an RB pair includes 14 OFDM symbols in time in the case of normal CP (see FIGS. 6(a)) and 12 OFDM symbols in time in the case of extended CP (see FIG. 6(b)).

Figure 7:
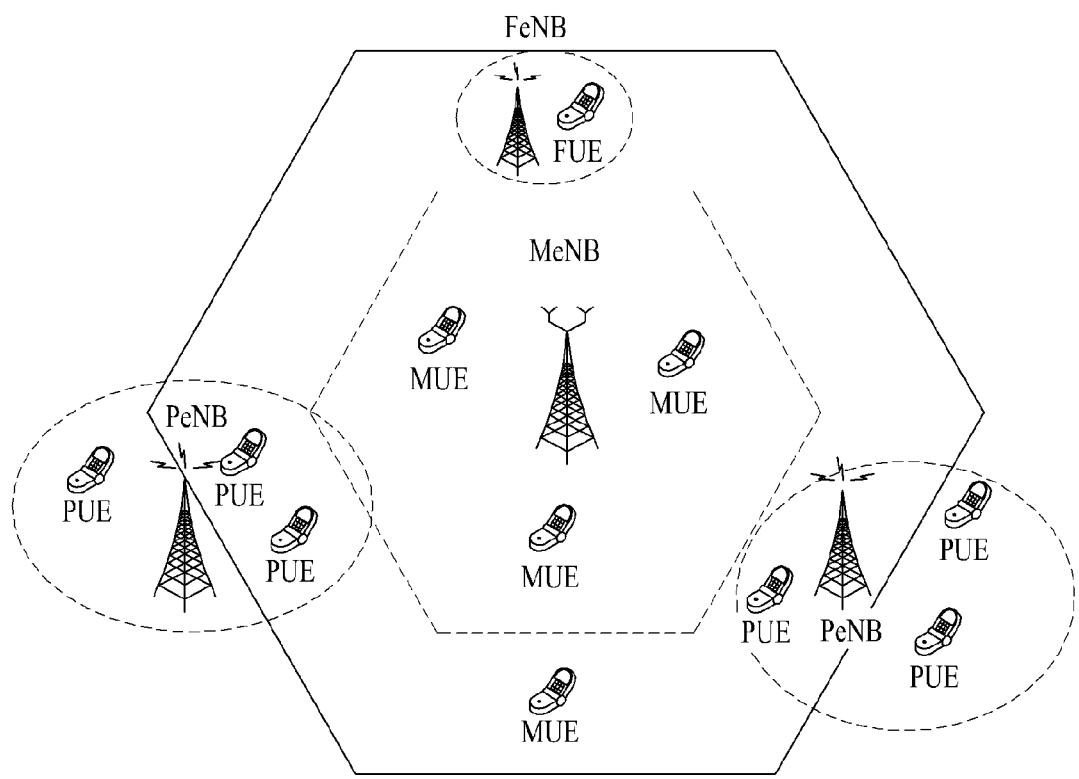
FIG. 7 illustrates a heterogeneous network environment.

In FIG. 7, the positions of RSs in an RB pair for a system where an eNB supports four Tx antennas are illustrated. Reference numerals '0', '1', '2' and '3' denote the REs of CRSs for antenna port 0 to antenna port 3, respectively, and reference character 'D' denotes the positions of DMRSs.

Heterogeneous Network Deployment

FIG. 7 illustrates a heterogeneous network wireless communication system including a macro eNB (MeNB) and a micro eNB, that is, a Pico eNB (PeNB) or a Femto eNB (FeNB). Herein, the term 'heterogeneous network' refers to a network in which a MeNB coexists with a PeNB or FeNB, in spite of the same Radio Access Technology (RAT).

A MeNB is a general eNB having broad coverage and high transmission power in a wireless communication system. The MeNB may also be called a macrocell.

A micro eNB (PeNB or FeNB) may also be called a microcell, a picocell, a femtocell, a Home eNB (HeNB), a relay, etc., for example (these exemplary PeNB or FeNB and MeNB may be collectively referred to as transmission points). A micro eNB (PeNB or FeNB) is a small-size version of a MeNB, which can operate independently, performing most of the functions of the MeNB. The PeNB or FeNB is overlaid in the coverage area of the MeNB or installed in a shadowing area beyond coverage of the MeNB. Compared to the MeNB, the PeNB or FeNB may accommodate a small number of UEs with small coverage and low transmission power.

A UE may be serviced directly by a MeNB (a Macro UE (MUE)) or by a PeNB or FeNB (a Pico UE (PUE) or Femto UE (FUE)). In any case, a PUE existing in the coverage of the PeNB may be serviced by the MeNB.

PeNBs or FeNBs may be classified into two types depending on whether they restrict access from a UE.

One type is an eNB of an Open access Subscriber Group (OSG) or non-Closed access Subscriber Group (non-CSG). The eNB allows access from a legacy MUE or a PUE or FUE of a PeNB or FeNB. The MUE may perform handover to an OSG eNB.

The other type is a CSG eNB. The CSG eNB does not allow access from a legacy MUE or a PUE or FUE of another PeNB or FeNB. Thus, a UE cannot perform handover to a CSG eNB.

Coordinated Multi-Point (CoMP)

To satisfy enhanced system performance requirements for the 3GPP LTE-A system, CoMP transmission and reception technology known as co-Multiple Input Multiple Output (MIMO), collaborative MIMO or network MIMO has been proposed. The CoMP technology can increase the performance of UEs located at a cell edge and an average sector throughput.

It is known that Inter-Cell Interference (ICI) generally degrades the performance of a UE at a cell edge and decreases an average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the legacy LTE system. However, it may be preferred to reduce the ICI or reuse the ICI as a desired signal for the UE, rather than to decrease the utilization of frequency resources per cell. For this purpose, CoMP transmission techniques may be adopted.

DL CoMP schemes are classified largely into Joint Processing (JP), and Coordinated Scheduling/Beamforming (CS/CB).

According to the JP scheme, each transmission point (eNB) of a CoMP cooperation unit may use data. The CoMP cooperation unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference with other UEs, as well.

Dynamic cell selection is a technique of transmitting a PDSCH from one point of a CoMP cooperation unit at one time. That is, one point of the CoMP cooperation unit transmits data to a single UE at a given time point, while the other points of the CoMP cooperation unit do not transmit data to the UE at the time point. A transmission point to transmit data to a UE may be dynamically selected.

Meanwhile, in the CS/CB scheme, a CoMP cooperation unit may perform cooperative beamforming for data transmission to a single UE. While only a serving cell transmits data to the UE, user scheduling/beamforming may be determined through coordination among cells of the CoMP cooperation unit.

UL CoMP reception refers to reception of a UL signal through cooperation among a plurality of geographically separate points. UL CoMP schemes include Joint Reception (JR) and Coordinated Scheduling/Beamforming (CS/CB).

In JR, a plurality of reception points receive a signal transmitted on a PUSCH. CS/CB is a technique in which while only one point receives a PUSCH, user scheduling/beamforming is determined through coordination among cells of a CoMP cooperation unit.

In this CoMP system, multi-cell eNBs can support data for a UE. In addition, the eNBs support one or more UEs simultaneously in the same radio frequency resources, thereby increasing system performance. The eNBs may also operate in Space Division Multiple Access (SDMA) based on CSI between a UE and the eNBs.

A serving eNB and one or more cooperative eNBs are connected to a scheduler through a backbone network in the CoMP system. The scheduler may receive channel information about the channel states between a UE and the cooperative eNBs, measured by each cooperative eNB and operate based on the channel information. For example, the scheduler may schedule information for cooperative MIMO for the serving eNB and the one or more cooperative eNBs. That is, the scheduler may transmit a command directly to each eNB in regard to the cooperative MIMO operation.

As noted from the above description, it can be said that a CoMP system operates as a virtual MIMO system by grouping a plurality of cells into one group. Basically, the CoMP system adopts a MIMO communication scheme using multiple antennas.

FIG. 8 illustrates CoMP clusters. A CoMP cluster is an afore-described CoMP cooperation unit. FIG. 8(a) illustrates a case in which cells use different Physical Cell IDs (PCIDs) in a CoMP cluster, and FIG. 8(b) illustrates a case in which cells use the same PCID in a CoMP cluster. Even though cells use the same PCID in a CoMP cluster, different CoMP clusters (CoMP cluster A and CoMP cluster B in FIG. 8(b)) may use different PCIDs and cells of a single CoMP cluster may be configured in the form of distributed antennas or Remote Radio Heads (RRHs) of a single eNB, sharing the same PCID. Or this configuration may be modified so that some of the cells use the same PCID in the single CoMP cluster.

If cells share the same PCID, all of the cells may transmit common signals such as Primary Synchronization Signal (PSS)/Secondary Synchronization Signal (SSS), CRS, PBCH, CRS-based PDCCH/PDSCH at the same time, thus increasing the quality of a received signal and eliminating a shadowing area. Or some cells having high transmission power among the cells having the same PCID may transmit common signals, whereas the other cells do not the common signals. However, in the case of transmission of CSI-RSs or UE-specific RSs or unicast data transmission on a PDSCH based on UE-specific RSs, each cell may transmit individually, thus offering a cell splitting gain.

Enhanced-PDCCH (EPDCCH)

As a solution to lack of PDCCH capacity caused by CoMP, MU-MIMO, etc. and a decrease in PDCCH performance caused by ICI, etc., an EPDCCH transmittable in a legacy PDSCH region is under consideration in a post-Release 11 LTE system. Compared to a legacy CRS-based PDCCH, channel estimation may be performed on the EPDCCH based on DMRSs, in order to achieve a precoding gain.

While a legacy PDCCH is transmitted in REGs or CCEs each having REGs, an EPDCCH may be transmitted in Enhanced REGs (EREGs), Enhanced CCEs (ECCEs), and a PRB pair. An ECCE may include four EREGs and one PRB pair may include four ECCEs. Like the PDCCH, the concept of aggregation level is applied to the EPDCCH. However, the aggregation level of the EPDCCH is based on ECCEs.

EPDCCH transmissions may be categorized into localized EPDCCH transmission and distributed EPDCCH transmission depending on the configuration of a PRB pair used for EPDCCH transmission. In the localized EPDCCH transmission, DCI is transmitted in ECCEs contiguous in the frequency domain. To achieve a beamforming gain, a predetermined precoding may be used. For example, the localized EPDCCH transmission may be performed in as many contiguous ECCEs as determined by an aggregation level. On the other hand, in the distributed EPDCCH transmission, an EPDCCH is transmitted in a PRB pair divided in the frequency domain. The distributed EPDCCH transmission offers a frequency diversity gain. For example, the distributed EPDCCH transmission may be performed in an ECCE having 4 EREGs from different PRB pairs defined in the frequency domain.

To receive/acquire DCI through an EPDCCH, a UE may perform blind decoding in a similar manner to in the legacy LTE/LTE-A system. More specifically, the UE may attempt to decode (may monitor) a set of EPDCCH candidates for DCI formats corresponding to a transmission mode configured for the UE, for each aggregation level. The set of EPDCCH candidates that are monitored may be called an EPDCCH USS. This SS may be set/configured for each aggregation level. Aggregation levels 1, 2, 4, 8, 16, and 32 are available according to a subframe type, a CP length, and the amount of available resources in a PRB pair, which is a difference from the afore-described legacy LTE/LTE-A system.

At present, an EPDCCH is defined only for a USS. If the EPDCCH is also used for a CSS (e.g., because CRS-based PDCCH transmission is impossible in a subframe or carrier without CRSs, an EPDCCH-based CSS may be introduced), resources to be used for a USS may be wasted. More specifically, a CSS may be located at lower indexes in the EPDCCH, like a CSS in the legacy PDCCH (as described before, the starting point parameter $Y_k$ of a PDCCH candidate is 0 in a PDCCH CSS and thus the PDCCH CSS resides at lower indexes). Particularly, since DCI is distributed across a plurality of PRB pairs in distributed EPDCCH transmission, if a CSS is located in a lower index area of a PRB pair configured for an EPDCCH, resources available for distributed transmission may be reduced (to 0 in an extreme case) for a UE having some REGs overlapped with the CSS. Accordingly, various embodiments for solving this problem will be described below.

The following description is given for a case in which an EPDCCH is also used for a CSS, that is, a CSS is defined in a PDSCH region, like a USS. If a CSS exists only in a PDCCH region as conventionally and an EPDCCH is used only for a USS, a UE may operate in relation to the EPDCCH as follows. The UE may group REs included in a PRB set of a received subframe into EREGs, index the EREGs, group the indexed EREGs into ECCEs, and then index the ECCEs. The UE may determine EPDCCH candidates that form the USS based on the indexed ECCEs and perform blind decoding on the EPDCCH candidates. If the EPDCCH is also used for a CSS and a specific resource unit (EREG or ECCE) of the CSS overlaps with the USS in this operation, the UE may operate as in the following embodiments of the present invention. Or the UE may be configured to operate as described in the following embodiments, without making a decision as to whether a specific resource unit overlaps with the USS.

Embodiment 1

A UE may exclude specific resource units (EREGs/ECCEs) of a CSS overlapped with a USS from EREG/ECCE indexing.

For this purpose, a network may indicate specific EREGs/ECCEs to be excluded from an SS (or the configuration of an SS) to the UE by signaling (e.g., RRC signaling). Upon receipt of the signaling, the UE may index EREGs/ECCEs except for the signaled EREGs/ECCEs during EREG/ECCE indexing, determine EPDCCH candidates, and perform blind decoding on the EPDCCH candidates. In this case, the network may configure a CSS for the UE or other UEs (e.g., post-LTE Release 10 UEs) using the EREGs/ECCEs excluded from the indexing.

EREGs/ECCEs excluded from indexing may be predetermined. For example, a specific region (which may include ECCEs, EREGs, a PRB pair (set), etc.) may be preset as not allowed for EREG/ECCE indexing. Then the UE may receive a signaling indicating a PRB pair configuration or an SS configuration for an EPDCCH and may index EREGs/ECCEs except for the indicated region.

Figure 9:
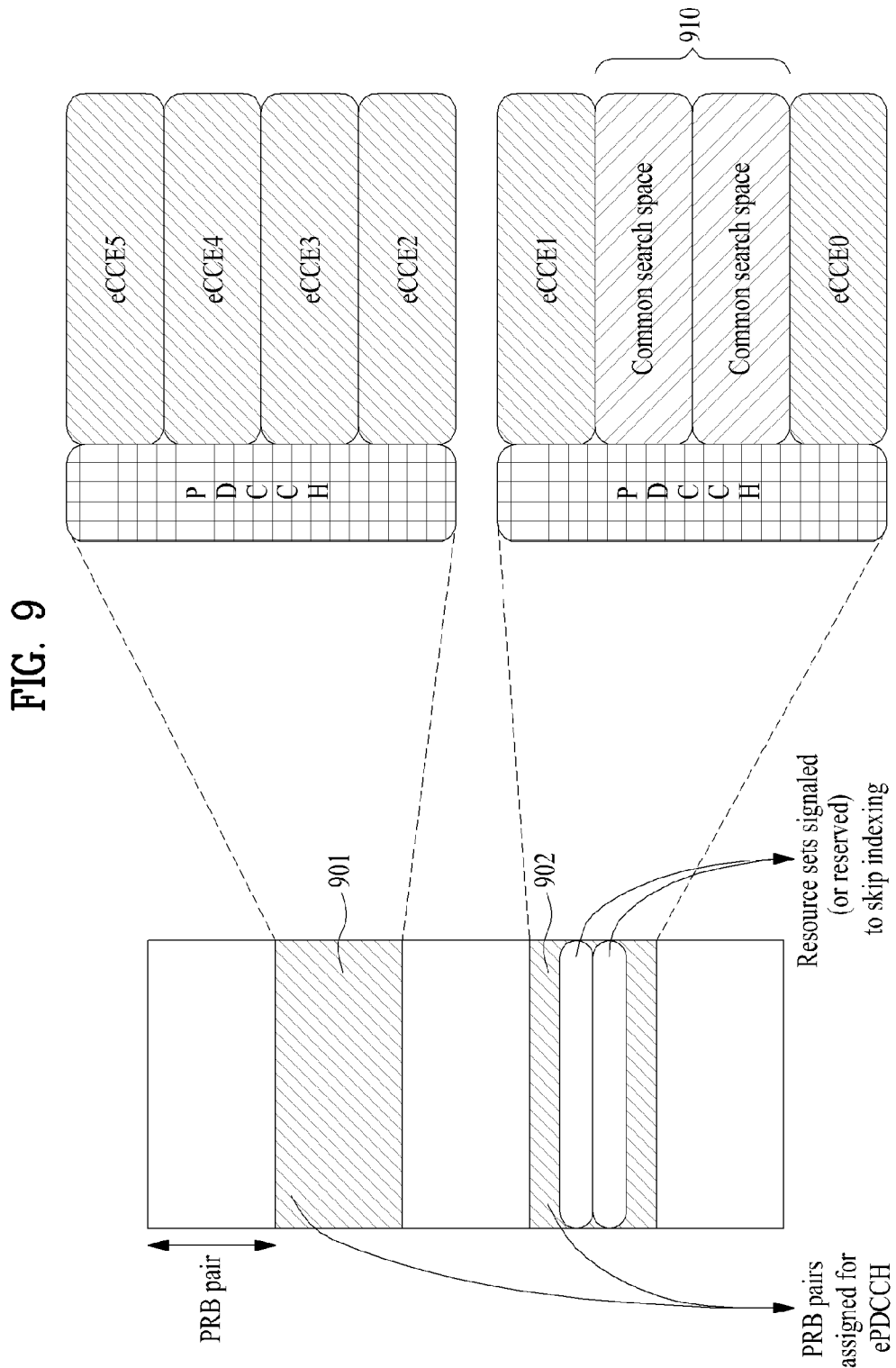
FIGS. 9, 10, and 11 illustrate blind decoding methods of a User Equipment (UE) according to embodiments of the present invention.

FIG. 9 illustrates an example in which preset ERGEs/ECCEs or signaled ERGEs/ECCEs are excluded from ERGE/ECCE indexing. While ECCEs are distinguished from one another in FDM in a PRB pair in FIG. 9, this is purely exemplary. In FIG. 9, the positions of ECCEs are not necessarily their physical positions.

Referring to FIG. 9, a UE configures a USS in two PRB pairs 901 and 902, by way of example. The two PRB pairs 901 and 902 may be included in one PRB pair set and information about the two PRB pairs 901 and 902 may be signaled by higher-layer signaling.

After the UE indexes the REs of the two PRB pairs in units of an EREG, the UE may index EREGs in units of an ECCE, as illustrated in FIG. 9. The UE may skip signaled/preset specific ECCEs 910 during the ECCE indexing. Then the UE may perform blind decoding for each aggregation level based on the indexing result except for the specific ECCEs.

Embodiment 2

Embodiment 1 may cause collision between resources configured for transmitting an ACK/NACK response based on ECCE indexes. Therefore, if specific resource units overlap with a USS, a UE may skip an EPDCCH candidate including the specific resource units during blind decoding in another embodiment of the present invention. The specific resource units may be signaled/preset EREGs/ECCEs unavailable for a USS. Compared to Embodiment 1, although EREG/ECCE indexing is performed in the same manner, an EPDCCH including overlapped resource units is not blind-decoded in Embodiment 2.

Embodiment 3

If a USS overlaps with a specific resource unit of a CSS, a UE may use a resource apart from the specific resource unit by a specific offset, instead of the overlapped specific resource unit, for indexing or EPDCCH candidate decision. The specific offset may be predetermined or indicated by higher-layer signaling. The resource indicated by the specific offset may be an available resource nearest to the overlapped position. In other words, the resource indicated by the specific offset may be a nearest resource along the frequency axis, which is included in neither the CSS nor the USS. As the resource apart from the overlapped position by the offset is used, another signal (e.g., a scheduling request, etc.) may be transmitted in resources configured for transmission of an ACK/NACK related to the specific resource unit.

Figure 10:
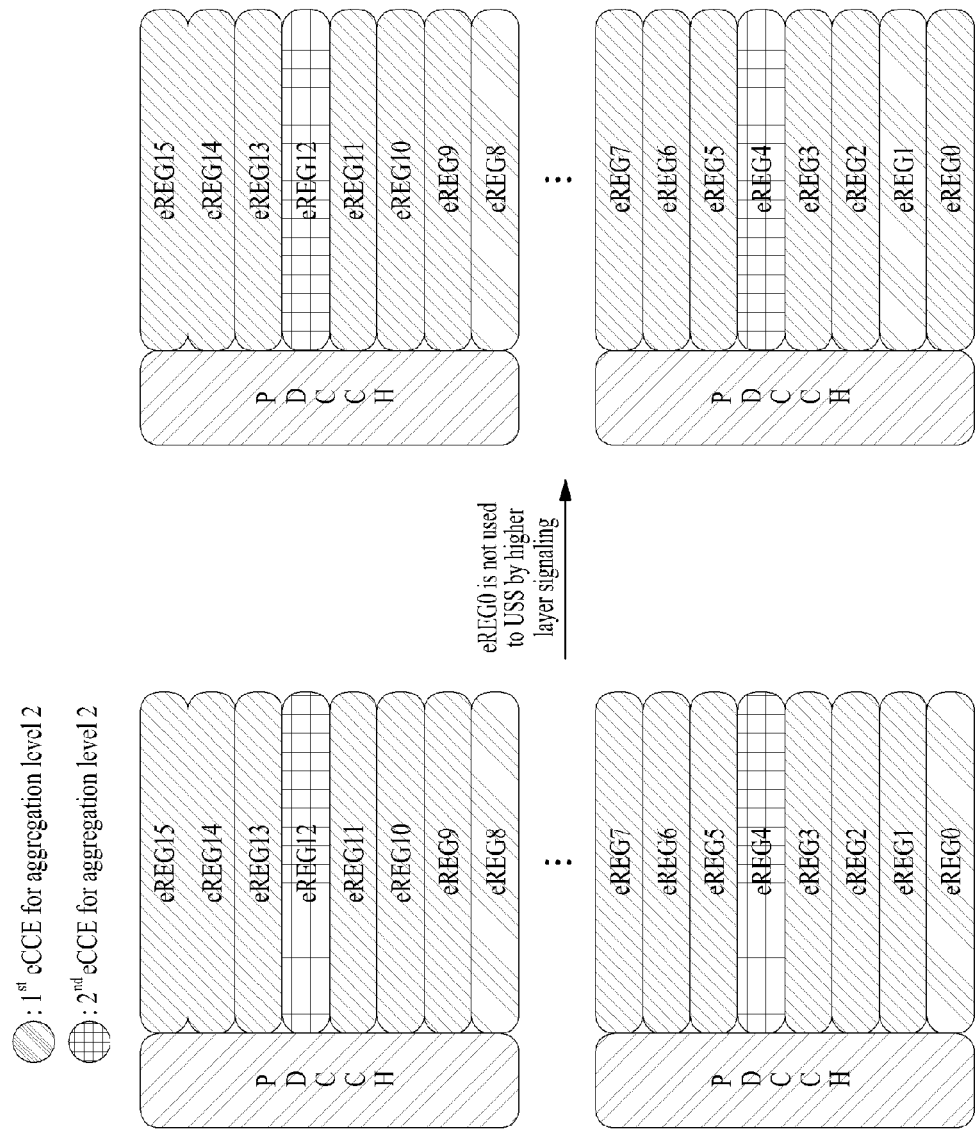

An example of Embodiment 3 is illustrated in FIG. 10. FIG. 10 is based on the premise of distributed transmission, an SS at aggregation level 2, eight EREGs being included in a PRB pair, and two EREGs forming one ECCE. However, this premise is exemplary. Thus, a PRB pair may include 16 EREGs and 4 EREGs may form one ECCE. To configure an SS with aggregation level 2, a UE may index EREGs and determine EREGs 0 and 8 as one ECCE and EREGs 4 and 12 as one ECCE. If ECCE 0 is a specific resource unit for a CSS, the UE may determine EREG 8 and EREG 1 nearest to ECCE 0, instead of EREG 0 overlapped with the USS, as an ECCE. In other words, the UE configures an ECCE using an EREG indicated by an offset of 1 and then determines the ECCE as an EPDCCH candidate. Herein, EREG 0 is a resource excluded from the USS, preset or indicated by higher-layer signaling. EREG 0 may satisfy the condition that it is not included in either the CSS or the USS.

Figure 11:
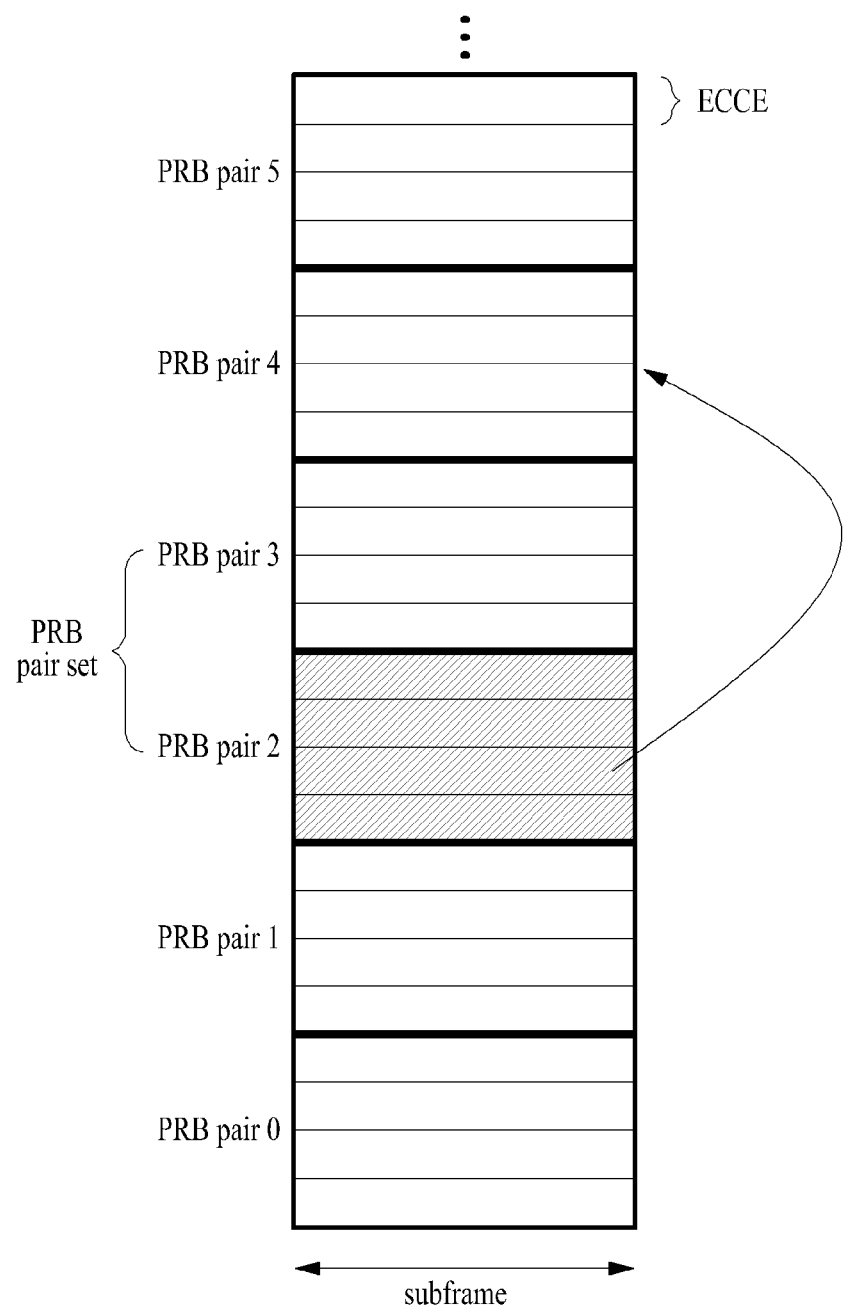

FIG. 11 illustrates another example of Embodiment 3. In FIG. 11, one PRB pair includes 4 ECCEs and at least one localized PRB pair set is configured for a UE. Signaled/preset PRB pairs configured as a CSS are shaded in FIG. 11. In the illustrated case of FIG. 11, the UE will index EREGs and ECCEs of PRB pairs 2 and 3 in a PRB pair set configured by higher-layer signaling, etc., determine EPDCCH candidates, and blind-decode the EPDCCH candidates. However, the UE may be aware that the configured PRB fair 2 overlaps with a CSS and thus use a PRB fair (PRB pair 4 in FIG. 11) apart from PRB pair 2 by a predetermined offset in configuring an EPDCCH candidate. This may imply that a PRB pair configured for a USS is shifted due to a CSS.

Embodiment 4

An offset for a starting position of an EPDCCH candidate in a USS may be set to be equal to or larger than a predetermined value and resources below the offset may be used for other purposes (e.g., a CSS, an Enhanced PCFICH (EPCFICH), an Enhanced PHICH (EPHICH), etc.). The offset may be preset or indicated by higher-layer signaling. The indexing of Embodiment 1 and general EREG/ECCE indexing are applicable to Embodiment 4. Since Embodiment 4 is preferably used when UEs index specific resources in the same manner, it will be useful in the case of a UE group-based CSS. That is, Embodiment 4 is viable when a CSS is configured for UEs sharing a PRB pair set related to EPDCCH transmission. If all UEs within a cell transmit EPDCCHs in the same PRB pair set, the CSS may be used as a cell-specific CSS.

Embodiment 5

Unlike the foregoing embodiments, a PRB pair set for a CSS may be distinguished in advance from a PRB pair set for a USS in Embodiment 5. An eNB may signal a PRB pair set for a CSS and a PRB pair set for a USS distinguishably. To reduce signaling overhead, a resource set (one or more PRB pairs) for a CSS may be preset. For example, 4 PRB pairs in a low frequency band of a system bandwidth may be reserved for a CSS. Or a specific ECCE set or RE set may be reserved for a CSS. The ECCEs of the CSS may be distributed in the frequency domain. In this case, a legacy UE may not schedule the reserved region and a UE capable of decoding an EPDCCH CSS may use this region as a CSS. Because it is difficult to perform DMRS-based beamforming on the region reserved for a CSS, CRS-based EPDCCH transmission may be applied (or a technique such as random beamforming may be used). In another example, a subframe set in which an EPDCCH CSS should be monitored may be preset or indicated by higher-layer signaling.

The above-described embodiments may be used even when control signaling such as an EPCFICH, an EPHICH, etc. is introduced in an EPDCCH region (i.e., transmitted in a PDSCH region). The network may signal ECCEs/EREGs corresponding to resources for a control signal such as a PCFICH, a PHICH, etc. to the UE so that the UE may exclude these resources from configuring an SS.

Or different PUCCH resource configurations for ACK/NACK transmission may be indicated for different SSs. For example, a different PUCCH offset indicating a stating index of PUCCH resources, a different resource set being candidates of actually used ACK/NACK resources (an actually used resource set among candidate resource sets may be indicated by DCI), or a different virtual cell ID used for PUCCH resources may be set for each SS. Further, PUCCH power control may be performed individually for each SS. For example, upon receipt of a DL ACK in a first SS, a UE may transmit an ACK/NACK according to a PUCCH resource configuration of the first SS and perform power control corresponding to the first SS.

Figure 12:
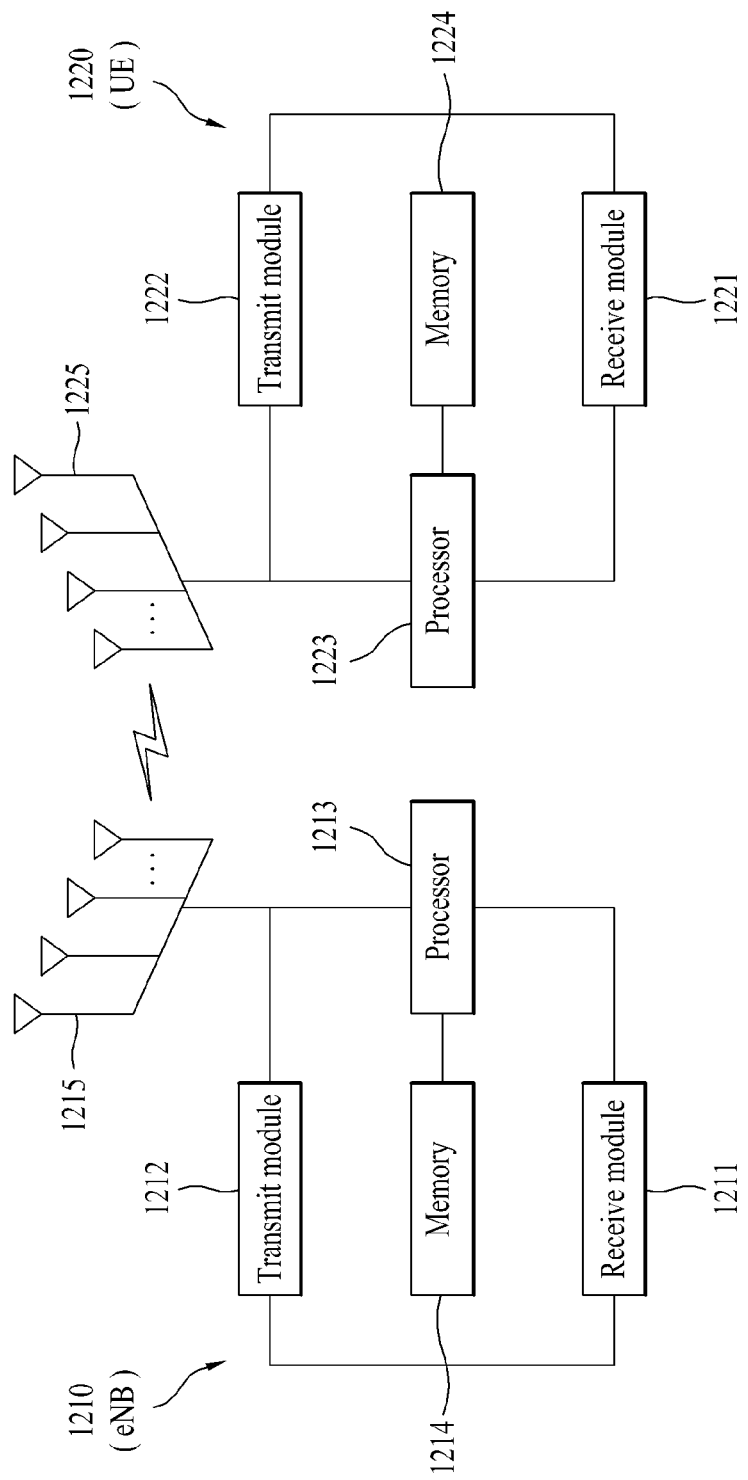
FIG. 12 is a block diagram of a transmission apparatus and a reception apparatus.

FIG. 12 is a block diagram of a transmission point and a UE according to an embodiment of the present invention.

Referring to FIG. 12, a transmission point 1210 according to the present invention may include a reception module 1211, a transmission module 1212, a processor 1213, a memory 1214, and a plurality of antennas 1215. The transmission point 1210 supports MIMO transmission and reception using the plurality of antennas 1215. The reception module 1211 may receive UL signals, data, and information from a UE. The transmission module 1212 may transmit DL signals, data, and information to a UE. The processor 1213 may provide overall control to the transmission point 1210.

The processor 1213 of the transmission point 1210 according to the embodiment of the present invention may perform necessary operations in the afore-described embodiments.

Besides, the processor 1213 of the transmission point 1210 processes received information and information to be transmitted to the outside of the transmission point 1210. The memory 1214 may store the processed information for a predetermined time and may be replaced with a component such as a buffer (not shown).

Referring to FIG. 12 again, a UE 1220 according to the present invention may include a reception module 1221, a transmission module 1222, a processor 1223, a memory 1224, and a plurality of antennas 1225. The UE 1220 supports MIMO transmission and reception using the plurality of antennas 1225. The reception module 1221 may receive DL signals, data, and information from an eNB. The transmission module 1222 may transmit UL signals, data, and information to an eNB. The processor 1223 may provide overall control to the UE 1220.

The processor 1223 of the UE 1220 according to the embodiment of the present invention may perform necessary operations in the afore-described embodiments.

Besides, the processor 1223 of the UE 1220 processes received information and information to be transmitted to the outside of the UE 1220. The memory 1224 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 1210 in FIG. 12 is applicable to a relay as a DL transmitter or a UL receiver, and the description of the UE 1220 in FIG. 12 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for receiving control information on an Enhanced Physical Downlink Control Channel (EPDCCH) by a User Equipment (UE), the method comprising:
   indexing, by the UE, Resource Elements (REs) included in a Physical Resource Block (PRB) set of a received subframe in units of an Enhanced Resource Element Group (EREG);
   indexing, by the UE, the indexed EREGs in units of an Enhanced Control Channel Element (ECCE); and
   determining, by the UE, EPDCCH candidates forming a UE-specific search space based on the indexed ECCEs and performing blind decoding on the determined EPDCCH candidates,
   wherein the UE determines whether a specific resource unit of the UE-specific search space overlaps with a common search space,
   wherein if the specific resource unit of the UE-specific search space overlaps with the common search space, the UE determines an EPDCCH candidate by replacing the specific resource unit among resource units of the UE-specific search space with another resource unit not included in either the common search space or the UE-specific search space.

2. The method according to claim 1, wherein the another resource unit is a resource unit apart from the specific resource unit by an offset.

3. The method according to claim 1, wherein the specific resource unit is one of an EREG and an ECCE.

4. The method according to claim 1, wherein at least one resource unit for the common search space is indicated by higher-layer signaling.

5. The method according to claim 1, wherein the PRB set is one of a distributed EPDCCH PRB set and a localized EPDCCH PRB set.

6. The method according to claim 5, wherein the common search space is located in the PRB set of the subframe.

7. The method according to claim 1, wherein the ECCE includes four EREGs.

8. The method according to claim 1, wherein a Physical Uplink Control Channel (PUCCH) for transmission of an ACK related to the common search space and the UE-specific search space is configured for each of the common search space and the UE-specific search space.

9. A User Equipment (UE) for receiving control information on an Enhanced Physical Downlink Control Channel (EPDCCH), the UE comprising:
   a reception module; and
   a processor that:
   indexes Resource Elements (REs) included in a Physical Resource Block (PRB) set of a received subframe in units of an Enhanced Resource Element Group (EREG),
   indexes the indexed EREGs in units of an Enhanced Control Channel Element (ECCE),
   determines EPDCCH candidates forming a UE-specific search space based on the indexed ECCEs, and performs blind decoding on the determined EPDCCH candidates,
   wherein the processor determines whether a specific resource unit of the UE-specific search space overlaps with a common search space,
   wherein if the specific resource unit of the UE-specific search space overlaps with the common search space, the UE determines an EPDCCH candidate by replacing the specific resource unit among resource units of the UE-specific search space with another resource unit not included in either the common search space or the UE-specific search space.

* * * * *